United States Patent [19]

Korsgaard

[11] Patent Number: 4,938,006
[45] Date of Patent: Jul. 3, 1990

[54] METHOD FOR BUILDING UP A GROUND STORE OF PRESSED VEGETABLE MATERIAL

[76] Inventor: Ebbe Korsgaard, Agerövej 14, Karby, Denmark

[21] Appl. No.: 859,788

[22] Filed: May 5, 1986

Related U.S. Application Data

[63] Continuation of Ser. No. 638,967, Aug. 3, 1984, abandoned.

[30] Foreign Application Priority Data

Dec. 3, 1982 [DK] Denmark ............... 5366/82

[51] Int. Cl.$^5$ ............... B65B 9/10; B65B 43/42; B65B 55/00
[52] U.S. Cl. ............... 53/431; 53/459; 53/567; 53/576
[58] Field of Search ............... 53/253, 255, 258, 260, 53/431, 459, 469, 513, 567, 570, 575, 576; 56/343, 341; 141/10, 114, 313, 390; 198/861; 414/24.5, 111, 607, 608, 724; 100/65

[56] References Cited

U.S. PATENT DOCUMENTS

| | | | |
|---|---|---|---|
| Re. 9,956 | 12/1881 | Dederick | 53/258 |
| 3,135,191 | 6/1964 | Skinner | 53/530 |
| 3,416,434 | 12/1968 | Woserau et al. | 53/530 |
| 3,548,567 | 12/1970 | Manetta | 53/530 |
| 3,687,061 | 8/1972 | Eggenmuller et al. | 100/65 |
| 4,256,426 | 3/1981 | Buss | 414/24.5 |
| 4,275,985 | 6/1981 | Schremmer | 414/24.5 |
| 4,300,327 | 11/1981 | Bridger | 53/258 |
| 4,302,139 | 11/1981 | Malish | 414/24.5 |
| 4,337,805 | 7/1982 | Johnson | 141/114 |

FOREIGN PATENT DOCUMENTS 2151116 8/1978 Fed. Rep. of Germany .
2090112 7/1982 United Kingdom .

Primary Examiner—Robert L. Spruill
Assistant Examiner—Beth Bianca

[57] ABSTRACT

A method and apparatus for building up a ground store of pressed vegetable material wherein the material is picked up by a tractor loader and successively put through a funnel element which carries a store of a retractable plastic sheet hose, whereby a long row of bails are stored in the hose. The funnel element is moved stepwise forwardly by the tractor to consecutively provide the necessary space in the hose for enabling an introduction of the next bail. The tractor and/or loader may be provided with equipment for applying a treating fluid to the bails during the handling thereof, and the bails, thus treated, are stored in a practically sealed manner in the tubular sheet hose.

11 Claims, 1 Drawing Sheet

U.S. Patent  Jul. 3, 1990  4,938,006
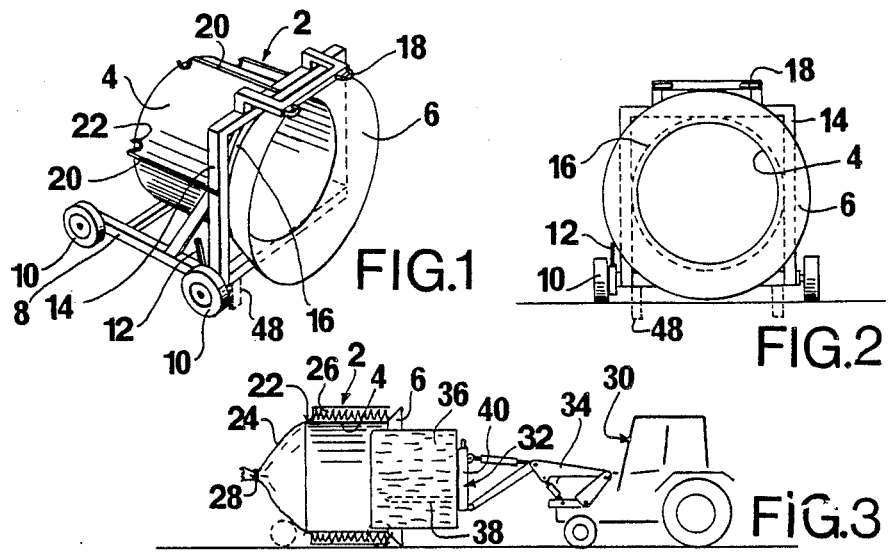
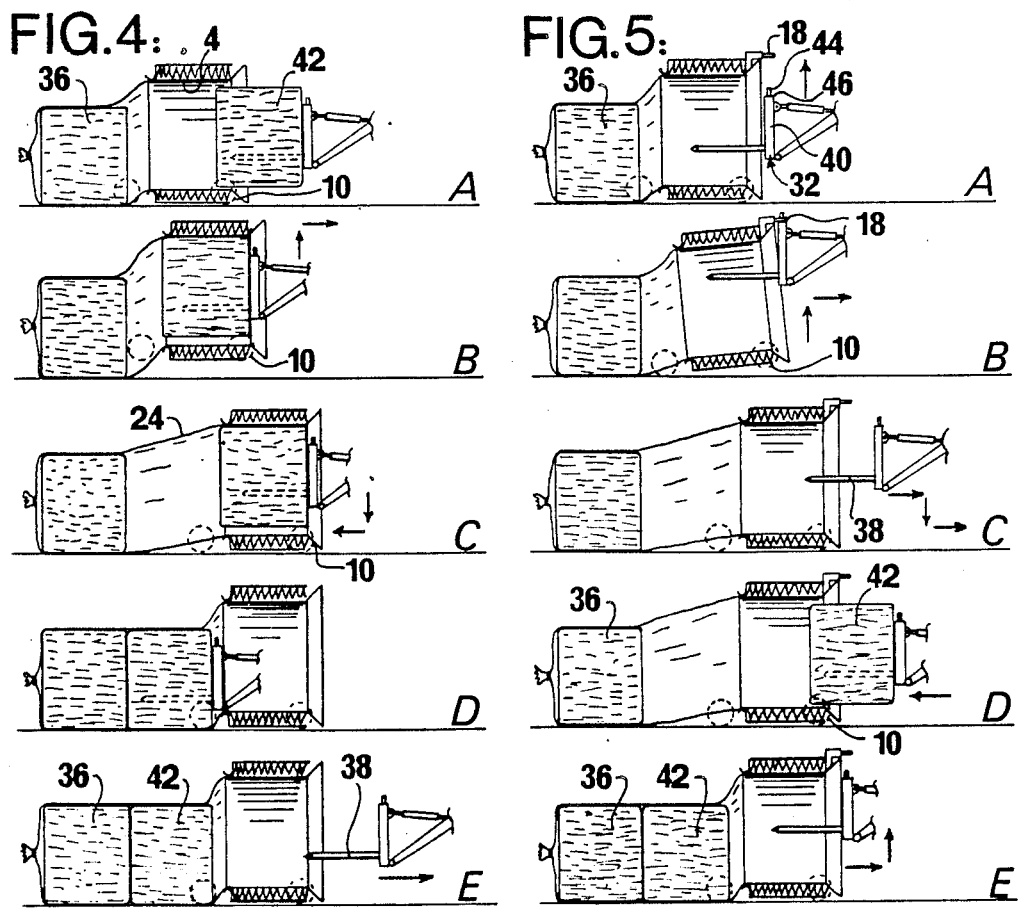

METHOD FOR BUILDING UP A GROUND STORE OF PRESSED VEGETABLE MATERIAL

This is a continuation of application Ser. No. 638,967, filed Aug. 3, 1984 now abandoned.

The present invention relates to a method of providing a protected store of straw or other vegetable material on the ground. Conventionally loose straw material is subjected to a bale pressing treatment and then the bales are put together in a stack or a row, which is covered by a plastic sheet.

Especially for the storage of short cut vegetable material for silage making, an improved method has been developed, whereby the loose material is cut and then forced into a wide tube of a plastic sheet, such that the material is better protected, in addition to its being fully enclosed in a tight cover material as required for proper ensiling. According to this method, as disclosed e.g. in DK-B-135971, a movable cutting machine is outletwise provided with a wide "sausage funnel" member, member on which a long and wide, wrinkled together sheet tube is placed, such that the short cut crop is delivered from the cutting device into the outer, closed end of the "sausage casing". This end is backed by a rigid wall element, which is connected with the cutting machine by cables supplied from cable drums on this machine. The cut material is forced rearwardly into the sheet tube by driven worms or other compression means, whereby by a certain pressure is built up in the delivery material between the outlet of the cutting device and the backing wall element. When this pressure is as high as desired, friction brake means of the cable drums allows for a supply of further cable, whereby the backing wall element is enabled to move rearwardly under the influence of the continued material supply to the sheet tube, and hereby the latter will be correspondingly drawn off the "funnel member". In practice, however, the backing wall element will not be moved rearwardly, at least not upon a first, short length of the filled sheet tube, because a wide filled sheet tube is not easily slidable on the ground; instead the cutting and compacting machine is moved forwardly, such that it leaves the produced filled sheet tube unmoved on the ground.

For this known method it is characteristic that a compaction of the material is built up in a continuous manner, since new material is steadily forced against the front end of the material in the sheet tube as backed, at the other end thereof, by the said wall element, which, though stationary, is connected with the cutting and compacting machine through steadily increasing lengths of stretched cables.

The present invention has for its purpose to provide an improved method of building up a store of compressed vegetable material, and the invention is based on the recognition that a storage in a wide and long sheet tube as provided by the said known method is advantageous in several respects, while the manner and means of filling the material into the sheet tube can be essentially simplified.

According to the invention use is made of a "funnel member" as in the described known method, but the vegetable material is not forced into this funnel member by any continuous compaction action against the pressure of any rear counter pressure backing wall element; rather, the material is introduced through the funnel member in a stepwise manner in the form precompacted bale units, which are merely laid in a row, while the funnel member is moved correspondingly stepwise forwardly so as to consecutively cause the newly added bales to be enclosed in the sheet tube as hereby retracted from the funnel member. More particularly, the material being filled is supplied to and moved through the funnel member as already conventional prepressed bale units, which are picked up on the field and brought to the funnel element by a vehicle such as, for example, a tractor equipped with a bale seizing and lifting implement. The funnel element, after each bale is fed therethrough, is caused to move forwardly in a stepwise manner for retraction or a payout of a length of sheet tube or hose sufficient for accommodating a next prepressed bale unit introduced through the funnel element. Thus, the compaction of the material may be effected with the use of already exsisting mobile bale presses, and no compaction should be carried out inside the sheet tube, i.e. the backing wall element as well as special compaction machinery will not be required. It is sufficient to consecutively place a new, already conventionally compressed bale at the front end of the row of such bales and to cause the funnel member to be moved forwardly past the added bale so as to enclose the bale in sheet tube material as hereby drawn off the funnel member. This work may be effected in a simple manner by means of an already existing tractor as provided with a suitable conventional bale carrier implement such as a front loader device, whereby the bales are easily introduceable through the funnel member, while the tractor itself is usable for the required movement of both the bales and of the funnel member, for drawing off further sheet tube material therefrom.

Thus, the sheet tube material is caused to gradually, stepwise, build the length thereof so as to fully envelope the row of prepressed bales as successively added to the bale row, without any serious stress being created in the sheet tube and without any special counter pressure means being necessary.

The invention also comprises the necessary means for effecting the new method, as further specified in the claims.

In the following the invention is described in more detail with reference to the drawings, in which:

FIG. 1 is a perspective view of an apparatus for use in carrying out the method of the invention, FIG. 2 is a front view of the apparatus of FIG. 1, FIG. 3 is a side view of the apparatus of FIG. 1 and a tractor, FIGS. (4A)-(E) are schematic side views illustrating one way of carrying out the method of the present invention, and FIGS. 5(A)-(E) are schematic side views illustrating another way of effecting the method of the present invention.

Referring now to the drawings, wherein like reference numerals are used throughout the various views to designate like parts and, more particularly, to FIGS. 1 and 2, according to these figures, the apparatus includes a unit 2 generally designated by the reference numeral having a large circular cylindrical "sausage funnel" member 4 with a conical inlet end 6. The funnel member 4 is rigidly mounted on a frame 8 supported by wheels 10, of which at least one wheel 10 is provided with a wheel brake device having an actuator lever 12. The frame has an upstanding front frame portion 14, to which is secured a ring member 16 for holding the funnel member 4 as a sole holding means therefor, insasfar as the funnel member 4 projects freely rearwardly from the ring member 16, without being otherwise supported. The top portion of the upstanding frame portion 14, optionally may be provided with forwardly projecting eyelet members 18 as discussed in more detail below.

On the ring member 16 is mounted a number of rearwardly projecting arms 20 having at their rear end a pressing shoe portion 22, which is resiliently forced against the rear outside of the funnel member 4 by virtue of a spring action of the arms 20, which are otherwise located somewhat spaced from the surface of the funnel member 4.

As indicated in FIG. 3, preparatory to use of the unit 2 a sheet tube or hose 24 is drawn onto the funnel memmber 4, whereby a long length of sheet tube or hose is storable on the funnel member in a wrinkled condition as shown at 26, with the outer hose end being bound or otherwise closed as shown at 28. It will be understood that due to the pressing shoes 22, the sheet tube or hose 24 may hereafter be drawn off the funnel member 4 with a certain friction.

In use, the unit 2 is placed on the ground at any seleccted position, and the wheel brake lever 12 is actuated to keep the associated wheel or wheels 10 braked, the wheels 10 otherwise being used solely for general transportation of the unit 2. A tractor generally designated by the reference numeral 30 as operating in the field and fitted with suitable bale handling implement 32 on, for example, a front loader 34 is operated so as to consecutively pick up and bring prepressed bales 36 from the field to the unit 2. The bale handling or seizing and lifting implement 32 will typically comprise a number of carrier spears 38 projecting from a backing frame 40.

The funnel member 4 is of a diameter somewhat larger than the standard diameter of modern large size "round bales" 36 as produced by modern bale pressing machines, and a first such bale 36, therefore, will be easily introduceable through the funnel 4,6 into the closed end of the hose 24 as shown in FIG. 3. When or as the unit 2 engages the ground surface through at least one braked wheel 10 the result of the bale introduction by the tractor 30 will be that the closed end of the hose 24 is forced rearwardly of the funnel member 4 by drawing off the relevant length of hose material 24 from the funnel member 4. The result will be as shown to the left in FIG. 4A, namely, that a first bale 36 will be located in a hose end portion retracted from the funnel member 4 and rests on the ground just behind the unit 2.

Thereafter the tractor 30 with the associated implement 32 is moved rearwardly for retraction from the bale 36, and a new bale 42 (FIG. 4A) as picked up by the tractor 30 is thereafter moved into the funnel member 4, by the tractor 30 and its implement 32, as shown in FIGS. 4A and 4B. However, the forward tractor driving is stopped when the new bale 42 is located just inside the funnel member 4, and then the bale handling implement 32 is caused to be lifted (FIG. 4B), whereby the unit 2 or at least one braked wheel 10 thereof will be lifted off the ground. Thereafter the tractor 30 is driven a short distance rearwardly (FIGS. 4B and 4C), whereby the unit 2, as frictionally engaged by the lifted bale 42 is carried correspondingly forwardly while the sheet tube or hose 24 is correspondingly drawn off the funnel member 4, because the first bale 36, resting on the ground will not slide along the ground by the retraction movement of the tractor 30. Thus, by the retraction, the unit 2 is displaced so as to cause an empty length of the hose 24 to be drawn off the funnel member 4 (see FIG. 4C). The operator of the tractor 30 causes this length to correspond roughly to the minimum length of a new bale 42, whereafter is lowered the front loader 34 so as to return the unit 2 into its ground engaging position (FIG. 4C). Thereafter, as shown in FIGS. 4C and 4D, the tractor driver moves the tractor 30 and the bale handling implement 32 forwardly so as to introduce the new bale 42 into the said empty length of the hose 24 (FIG. 4D), whereafter, the tractor 30 and bale handling implement 32, upon lowering thereof, is simply retracted from the newly introduced bale 42 by rearward motion of the tractor (FIG. 4D).

The tractor driver may thereafter pick up another bale 42 on the ground and then cause this new bale 42 to be introduced through the funnel member 4 and into the sheet tube or hose 24 by steps as illustrated in FIG. 4, whereby a very long row of juxtaposed, prepressed bales 36, 42 may be built up inside the hose 24, all according to the hose length as stored on the outside of the funnel member 4.

In FIG. 5, the bale handling implement 32, upon having placed the first bale 36, is retracted only to the front end of the funnel member 4 and then raised, see FIG. 5A, whereby an upwardly projecting top portion 44 on the backing frame 40 of the bale handling implement 32 is lifted into engagement with the eyelets 18 (FIG. 1). A top shoulder portion 46 of the backing frame 40 engaging the underside of the eyelets 18 will now, by further raising, cause the front end of the unit 2 and therewith the braked wheel 10 to be raised, FIG. 5B, whereafter the tractor is driven a step further rearwardly so as to drag the unit 2 into a new position, in which the bale handling implement 32 is lowered to get free of the eyelets 18, whereafter the tractor 30 is moved away for repeated bale pickup, as shown in FIG. 5C. Thus, the tractor leaves the unit 2 with sheet tube or hose 24 already adapted to receive a new bale behind the unit 2, and the new bale 42, therefore, can be driven into the sheet tube or hose 24 directly through the funnel member 4, as shown in FIG. 5D. Upon retraction of the bale handling implement 32 from the new bale, as shown in FIG. 5E, the implement is ready to cause the unit 2 to be advanced a further step as in FIGS. 5A–5C.

The unit 2, of course, may be designed to suit almost any size and shape of the bales, i.e. even rectangular bales.

It is important that the funnel member 4 is stabilized against being pushed rearwardly from the positions shown in FIGS. 4C and 5D, for example, if the bale being introduced is not fully free of the collar portion 6, and this is the main reason why at least one of the wheels 10 should be braked. Alternatively, the unit 2 may be stabilized by depending ground engaging spear or stop plate means as shown in dotted lines at 48 in FIG. 1. The sphere or stop plate means, of course, should be shiftable between the operative position, in which they disengage the ground only when the unit 2 is lifted, as in FIGS. 4B and 5B, and an inoperative position, in which the unit 2 is generally transportable on its wheels 10. The wheels 10 may be entirely avoided, if the unit is to be only transported in a lifted condition.

The described method will be very advantageous for the storing already of ordinary straw bales, but it should be emphasized that the bales may well be treated with any agent for ensiling or other purposes. A particularly important possibility is to use the bale handling implement 32 for introducing a treating agent into the bales as disclosed in UK Patent Specification No. 2,090,112, whereby the treatment, with, for example ammonia, may be effected in direct association with the transportation handling of the bales. It will be appreciated that the tractor and the bale handling implement 32, through well known, in the present connection constitutes a qualified part of the apparatus for carrying out the method, and it is regarded as an important combination feature that the required bale moving and lifting equipment, whether being a tractor or something else, may be equipped with means for supplying some desired treating agent to the bales during the handling thereof. Another possibility will be to provide the unit 2 with suitable means for applying the agent, such as injector spears, operable to be pushed into the single bales while these are present in the funnel member 4, such spears operating e.g. along generators of the rear side of the collar portion 6 so as to not penetrate the sheet tube or hose 24.

It should be mentioned that the sheet tube or hose 24, especially for holding treated material such as ensilage, should be strong enough to resist normal influences such as frost and penetration of stubble. The underside of the stored sheet tube or hose 24 on the funnel member 4 should be protected against scraping over sharp stones or other objects, and it may be protected by a lower shield plate, or the unit 2 may generally slide on a bottom plate member, preferably provided with lower runners. However, it will of course be possible to build up the store on some desired smooth ground or floor surface, and it could even be suggested to use the disclosed method for providing objects other than bales of straw, grass or other similar materials with protective casing, e.g. rows of palleted goods of any kind. Principally, according to the invention, the unit 2 could be selfpropelled for carrying out its required movement, but, in practice, it is easy to make use of the tractor for the same purpose.

I claim:

1. A method of providing a protected store of pressed material on the ground, the method comprising the steps of successively filling the material into a long hose of a sheet material through a funnel member forming a storage of the sheet material of the hose and from which the sheet material of the hose is caused to be successively paid out by moving the funnel member along the ground in accordance with a build up of material pressed into the ground supported hose behind the funnel member, characterized in that the step of filling includes supplying the material to and through the funnel member as conventionally prepressed bail units, which are picked up from a field and brought to the funnel member by a vehicle equipped with a bail seizing and lifting element, and in that the step of moving the funnel member includes moving said member after each through put of a bail unit in a stepwise forward direction for retraction or pay out of a length of sheet material of the hose sufficient for accommodating the next prepressed bail unit introduced through the funnel member.

2. A method according to claim 1, wherein the stepwise movement of the funnel member is effected by the vehicle.

3. A method according to claim 2, further comprising the steps of lifting the bail unit for frictional engagement with the wall of the funnel member thereby lifting the latter at least partially off the ground when the vehicle brings a new bail unit into the funnel member, and moving the vehicle so as to displace the raised funnel member forwardly for paying out an empty length of the sheet material and thereafter lowering the bail unit and therewith the funnel member for stabilized ground contact of the funnel member, moving said bail unit while it is in a still lifted position into said empty length of hose.

4. A method according to claim 2, further comprising engaging the funnel member by a retraction movement of the vehicle from the bail unit upon each delivery of a new bail unit into an empty length of the hose and to thereby cause the funnel member to be moved a step forwardly for paying out a new empty length of sheet material of the hose, which will thereafter receive a further new bail unit as introduced directly through the funnel member.

5. A method according to claim 3, whereby the funnel member is ground supported by ground engagment means providing a high resistance against displacement of a lowered funnel member along the ground while being released from said ground engagement in the lifted position of the funnel member.

6. A method according to claim 1, further comprising the steps of supplying at least one of a lye and another bail material treating fluid to the bail material during a mechanical handling of each bail unit between a pick up thereof and final delivery into the hose.

7. An apparatus for carrying out the method of claim 3, comprising a ground supported funnel member for holding a concentrated store of a retractable hose material, and a vehicle provided with a bail seizing and lifting element.

8. An apparatus according to claim 7, wherein the funnel member is provided with a ground engaging means for preventing the funnel member from being pushed along the ground whenever the funnel member assumes a lowered operative position.

9. An apparatus according to claim 7, wherein at least one of the funnel member and the vehicle is provided with means for actively supplying a treating fluid to the prepressed bail unit.

10. A method for covering large preformed bales by placing them inside of a tube of flexible weather resistant material, said method comprising: providing a gathered tube of flexible, weather-resistant material; providing a movable annular support for receiving such bales therethrough, supporting the gathered tube of material on said annular support in a substantially annular configuration with one end fully open and the other end closed; providing a movable vehicle having a bale lifting and carrying means for lifting and carrying said bales and a towing device mounted on said vehicle; lifting a bale with said bale lifting means and moving said vehicle to insert at least one end portion of such lifted bale through said annular support and into the tube through the open end of the tube on said annular support, and resting at least said inserted end portion of said bale and the subtending portion of the tube material on the ground to anchor said bale and the respective portion of the tube material, while maintaining said movable support in a substantially fixed position; and towing the support and the tube material supported by it with the towing device of said vehicle as said vehicle is moved away from such inserted bale to unfold a portion of said material so that the material will be pulled over the bale to cover the bale completely and an additional length of said tube will be unfolded therefrom to receive another bale.

11. A method for covering large preformed bales by placing them inside of a tube of flexible weather resistant material, said method comprising: providing a gathered tube of flexible, weather-resistant material; providing a movable annular support for receiving such bales therethrough, supporting the gathered tube of material on said annular support in a substantially annular configuration with one end fully open and the other end closed; providing a movable vehicle having means for lifting and carrying said bales and for moving said movable annular support; lifting a bale with said means and moving said vehicle to insert at least one end portion of such lifted bale through said annular support and into the tube through the open end of the tube on said annular support, and resting at least said inserted end portion of said bale and the subtending portion of the tube material on the ground to anchor said bale and the respective portion of the tube material, while maintaining said movable support in a substantially fixed position; and moving the support and the tube material supported by it away from such inserted bale with the said means of said vehicle to unfold a portion of said material so that the material will be pulled over the bale to cover the bale completely and an additional length of said tube will be unfolded therefrom to receive another bale.

* * * * *